April 8, 1969     B. W. DAVIS     3,436,776
SELF-BALLASTING STREAMER
Filed Feb. 23, 1967     Sheet 1 of 3

INVENTOR
Billy W. Davis
BY René E. Grossman
ATTORNEY

United States Patent Office 3,436,776
Patented Apr. 8, 1969

3,436,776
SELF-BALLASTING STREAMER
Billy W. Davis, Richardson, Tex., assignor to Texas Instruments Incorporated, Dallas, Tex., a corporation of Delaware
Filed Feb. 23, 1967, Ser. No. 618,114
Int. Cl. B63b *21/52, 35/00;* B63g *8/14*
U.S. Cl. 9—8                                     2 Claims

ABSTRACT OF THE DISCLOSURE

A device for maintaining a body at a predetermined depth in a fluid medium. The device, which is secured to the body, includes a pressure sensitive valve which operates in response to pressure changes due to changes in depth in the medium. The valve controls the flow of a gas to or from an inflatable bag which expands or contracts depending on the quantity of gas contained therein, displaces an amount of fluid that causes the body and the device to rise or sink. When a predetermined depth is reached for which the valve is adjusted, the valve operates to shut off further gas from entering or leaving the bag, causing the body and the device to remain at the predetermined depth.

---

This invention relates to flotation devices and more particularly to a device for automatically maintaining neutral buoyancy of an object at a predetermined depth in a fluid medium.

In many areas of scientific investigation of the properties and characteristics of various fluid media, it is desirable to be able to maintain an instrument package at a predetermined depth. One means for accomplishing this would be to attach the instrument package, via a connecting cable, to a float on the surface of the fluid medium. This approach, however, suffers from the disadvantage of transferring surface noise to the instrument package. A better approach would be to make the instrument package neutrally buoyant at the desired flotation depth.

Neutral buoyancy can be readily attained for any desired depth by exercising control over either the mass of the instrument package or the volume of fluid displaced by the package. Due to the dynamic unbalance of all fluid media occurring in nature, however, variability of one or the other (or both) of the above parameters is necessary to achieve neutral buoyancy at a predetermined depth. For example, the ocean is a dynamic mixture of liquids, solids and gases more or less constantly in motion. Salinity and temperature variations brought about by ocean currents and fresh water streams create a relatively wide variation in fluid density which causes an equally wide variation in the buoyant forces that act on a submerged body having a fixed mass and volume. Thus, even if, for example, the buoyant forces acting on an instrument package are initially perfectly neutral, it is highly unlikely that the package will remain submerged at a fixed depth in the ocean for more than a very short period of time. However, this problem can generally be overcome by making the buoyant forces on the package change in response to changes of pressure in the fluid medium, which pressure changes very little at a given depth even with changing density.

Accordingly, it is an object of this invention to provide a device whch changes the buoyancy of a submerged body in response to changes in pressure of the fluid medium into which the body is submerged.

Another object of the invention is to provide a device for automatically controlling the buoyancy of a body submerged in a fluid medium so as to maintain the body at a fixed depth in such a medium.

A further object is to provide a device which will cause a body to remain submerged at a fixed depth in a fluid medium, and upon the happening of a predetermined event, cause the body to rise to the surface of the medium.

A feature of the invention is a valve secured to the depth regulating device and controllable by pressure exerted on the valve by the fluid medium that will allow gas to flow either into or from an inflatable bag.

These and other objects and features of the invention will be better understood by reference to the following detailed description when read in conjunction with the appended claims and accompanying drawings in which like reference numerals refer to the same or corresponding parts in the different figures.

Figure 3:
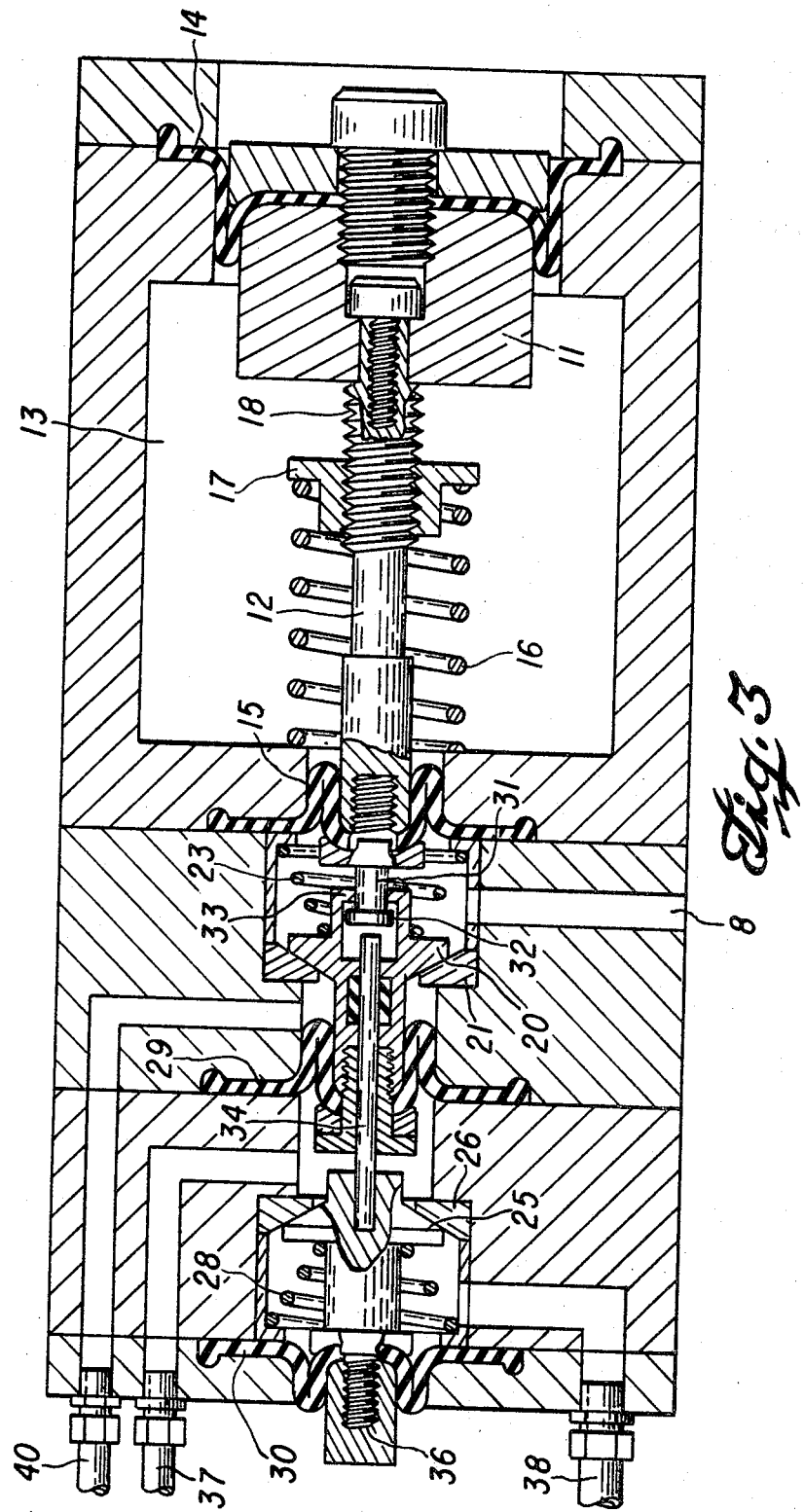
Figure 4:
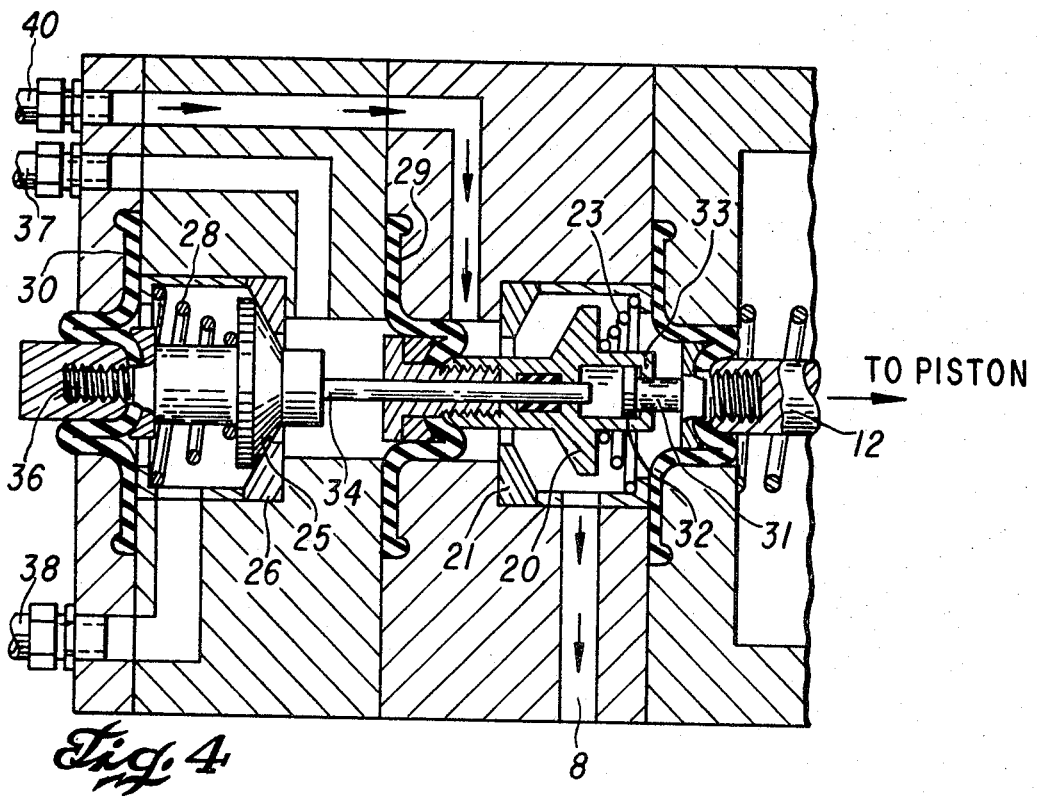
Figure 5:
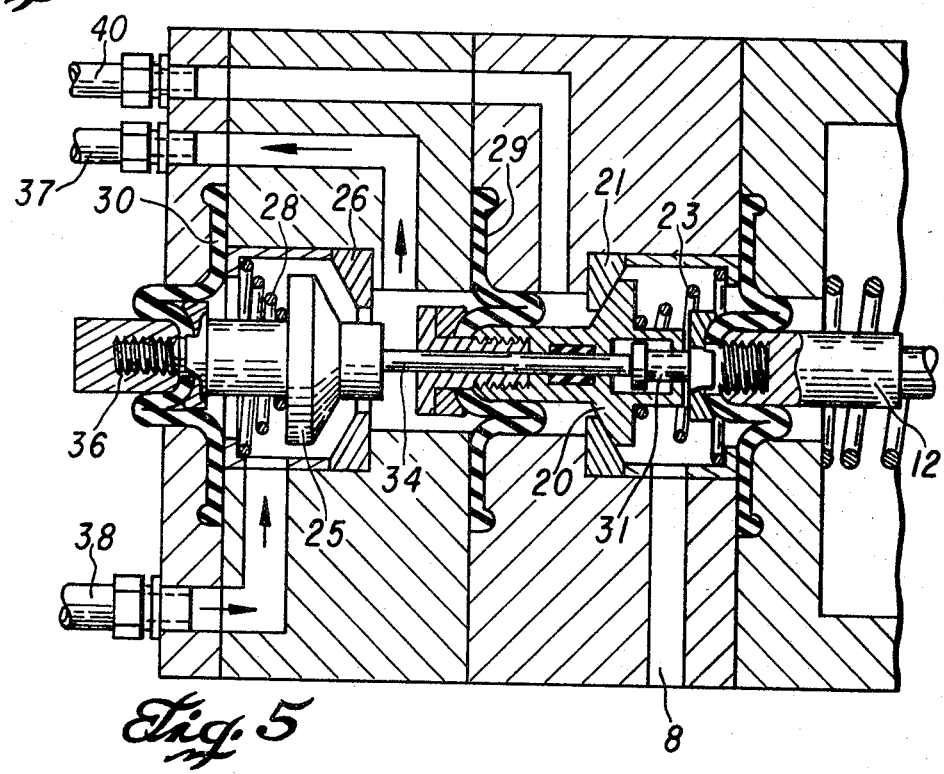

FIGURES 3, 4, and 5 are detailed cross-sectional views of a depth control valve, showing the valve respectively in a position having no flow path open therethrough (FIGURE 3); in a position allowing gas to flow through a first path (FIGURE 4), and in a position allowing gas to flow through a second path (FIGURE 5).

The basic operation of the present invention is based on Archimedes' law, which states that a fluid acts on a body immersed in the fluid with a net force which is vertically upward and equal in magnitude to the weight of the fluid displaced by the body. From this fundamental physical principle, it can be seen that for a given mass, an incompressible body submerged in a compressible fluid will continue to sink or rise in depth until it reaches the point of neutral buoyancy defined by Archimedes' law, that is, when the body reaches a depth at which the density of the fluid multiplied by the volume of fluid displaced by the body exactly balances the weight of the body. This balance of forces is highly unstable, however, because of the changing densities and currents common to fluid media. Consequently if accurate control is to be exercised over the depth at which the body is to be maintained, a means must be provided for sensing depth and another means, correlated with the depth sensing means, must be capable of varying the buoyant force which acts on the body in response to a change in depth. The buoyant force acting on a submerged body can be varied by changing either the mass of the body or the volume of the body or both.

Figure 1:
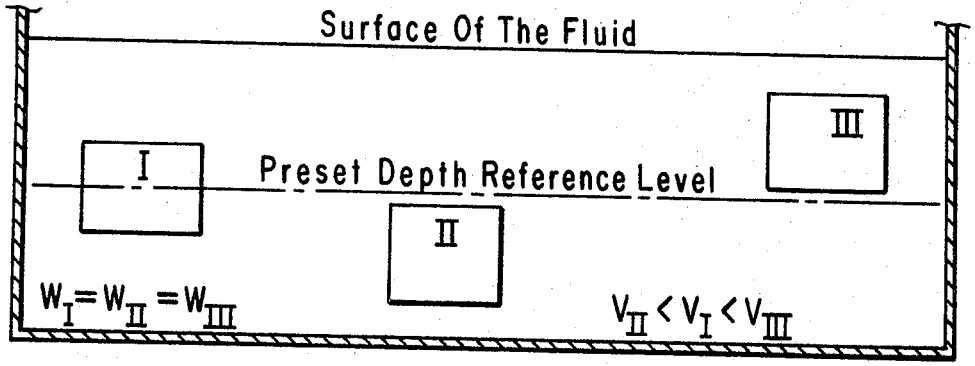
FIGURE 1 is a cross-sectional illustration indicating a fluid medium into whch are immersed three bodies having different volumes but the same weght.

FIGURE 1 illustrates the principle of neutral buoyancy variation by varying the volume of a body immersed in a fluid. In FIGURE 1, the fluid medium is assumed to have a uniform density throughout and a coefficient of compressibility which is greater than that of a body immersed within it. Further, the depth limits in the fluid medium are assumed to be such that a body will reach a point of equilibrium. In FIGURE 1, three bodies are shown in a fluid medium, namely, body I, body II and body III, each body having the same weight but a different volume. As illustrated in the figure, the volume of body III is the largest, the volume of body II is the smallest, and the volume of body I falls between the volume of body II and that of body III. In consequence, body I is shown as floating at a particular level, indicated as the reference level; body II, having a lesser volume but the same weight as body I, is shown as floating below the level of body I, while body III, having a greater volume than body I but the same weight, is shown as floating at a higher level than the level of body I.

In brief, the invention comprises an inflatable bag as, for example, a bladder enclosed within a perforated protective shell that rests in a semi-spherical cradle or other suitable support to which an instrument package is also secured. The bag has an inlet and an outlet which are respectively connected through a pressure valve to a source of gas and an outside port. By the operation of the valve in response to a fluid pressure less than the pressure at the preset depth at which the package is to be maintained, gas is allowed to flow from the bag, reducing its volume and fluid displacement through the perforations in the shell and thus causing the package including the bag and other attachments (the total of which is hereinafter referred to as the equipment) to sink. On the other hand, if the package is below the preset depth, the valve operates to admit gas into the bag, causing its volume and fluid displacement to increase and thus cause the equipment to rise. At the preset depth, no gas will flow either to or from the bag, and the equipment will remain at that depth until some external condition causes it to rise or sink, when one or the other of the above two operations is repeated.

Referring now to FIGURES 2, 3, 4 and 5, FIGURE 2 schematically shows a preferred embodiment of the invention. The instrument package 10 which may contain, for example, telemetric equipment, is secured by any suitable means to the supporting structure 9 which also supports the perforated sphere or shell 1, the depth sensing valve and the gas containers, tanks 7 and 7'. Within the shell 1 is contained an inflatable bag 3 which, in its uninflated condition, occupies relatively little space within the shell to provide room for its expansion on the admission of gas thereinto as described hereinafter.

The bag has an inlet 4 and an outlet 5 connected by suitable tubing or piping 37 and 40 respectively, through apertures in the shell to the pressure sensing valve 6, illustrated in detail in FIGURES 3, 4 and 5. The valve has a connection 38 to a gas tank 7 and the latter has a connection 39 to an additional gas tank 7'. Both tanks are welded or otherwise secured to the supporting structure 9. It will also be noted at this time that valve 6 has an exhaust port 8 for the flow of gas from the bag.

Figure 2:
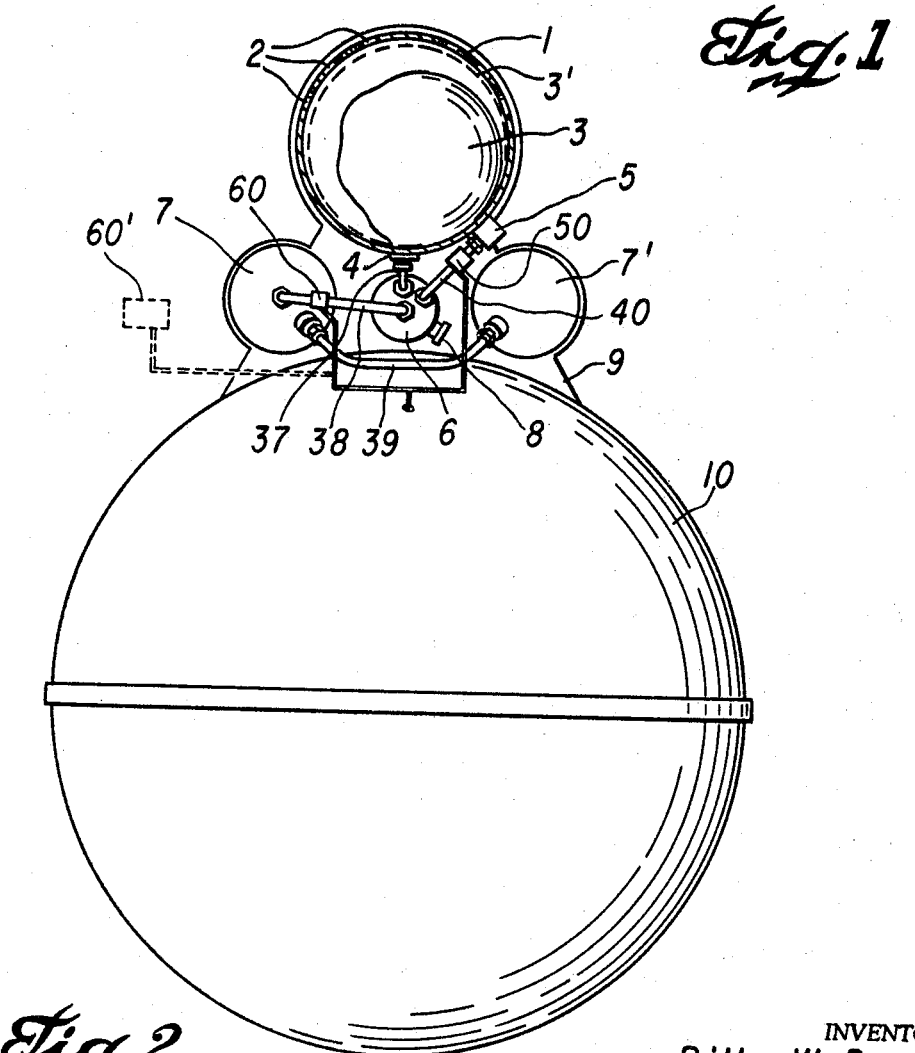
FIGURE 2 is a schematic elevational view of a flotation device according to the invention, with an instrument package secured to the device.

The operation of the invention is as follows: Assume that the entire equipment shown in FIGURE 2 is submerged below the surface of the fluid, and also below the preset depth level, as is indicated by the position of body II in FIGURE 1. In this position, the bag 3 will be less than fully expanded as indicated by the irregular solid outline of the bag in FIGURE 2, the fully expanded position being indicated by the dashed outline 3' in said figure. However, valve 6, responding to the depth pressure, opens the flow path to inlet 4 of the bag, causing gas to flow thereinto from gas tank 7 and/or tank 7' through piping 39, 38 and 37. As the bag inflates, the fluid contained between the bag and the inside of the shell 1 is forced out of the shell through the openings therein, thus increasing the volume of water displaced by the bag and causing the equipment to rise in the fluid. When the equipment rises to the preset depth level, the valve 6 operates in response to the reduced pressure to close the flow path to inlet 4, and since under this condition the flow path to exhaust port 8 is kept closed, the quantity of gas in the bag remains constant, causing the equipment to stabilize at the reference level.

If for any reason the equipment should rise above the preset depth, valve 6 responds accordingly to the smaller fluid pressure, opens the flow path to exhaust port 8 and a quantity of gas is expelled from the bag via outlet 5, pipe 40, valve 6 and exhaust port 8, thus causing the bag to displace less fluid and causing the equipment to descend to the preset level when the valve operates to close exhaust port 8.

The construction and operation of the depth sensitive valve 6, shown in detail in FIGURES 3, 4 and 5, will now be described. Referring particularly to FIGURE 3, the principal components of the valve are a piston 11 and two spools 20 and 25 which seat against their respective seats 21 and 26, the spools being controlled by movement of the piston shaft 12. The piston 11 is responsive to pressure acting upon it by the fluid medium into which the valve is immersed. A compression spring 16 acting against the rear of the piston, along with air pressure of about one atmosphere in the chamber 13 behind the piston, establish an equilibrium point, as illustrated in FIGURE 3, at which the forces acting on the rear of the piston tending to move the piston to the right equal the fluid pressure acting on the front of the piston at the desired flotation depth tending to move the piston to the left. The spring force acting on the rear of the piston is adjustable by varying the compression of spring 16. This is done by moving the threaded collar 17 along the threaded portion 18 of the shaft 12 extending behind piston 11. The air pressure is sealed within chamber 13 (and fluid sealed out) by the rolling diaphragms 14 and 15 mounted, respectively, at the piston end and the opposite end of chamber 13.

Spools 20 and 25 along with their respective seats 21 and 26, control the flow of gas to and from the bag 3 shown in FIGURE 2.

When the equipment is at the preset depth in the fluid, the valve 6 is in the equilibrium position shown in FIGURE 3. As previously stated, fluid pressure impinging on the piston 11 tending to push the piston to the left under this condition is exactly offset by the force from spring 16 and the air pressure in chamber 13 urging the piston to the right. With this balance of forces, both spools 20 and 25 are seated against their respective seats 21 and 26 and keep closed, via spool 25 and seat 26, the flow path through the valve between inlet 4 of the bag 3 via pipe 37 and the gas tank 7 via pipe 38 and, via spool 20 and seat 21, the flow path through the valve between outlet 5 of the bladder connected to pipe 40 and exhaust port 8, thus allowing no gas to flow either to or from bag 3. Spools 20 and 25 are held firmly seated by the force of springs 23 and 28, respectively, mounted behind the spools and tending to force the spools against their respective seats.

In order that both spools 20 and 25 may be seated simultaneously and still be operable separately when gas is required to flow either to or from the bag, a small amount of "slack" is incorporated in the mechanisms for moving the spools away from their seats. These mechanisms and the "slack" incorporated therein are better explained in connection with a movement of the piston to the right or left in response to a decrease or increase of fluid pressure on the piston. That action is as follows:

If the equipment depicted in FIGURE 2 rises in the fluid medium to a lesser depth than the equilibrium depth (the condition represented in FIGURE 4), the fluid pressure will be decreased and thus a lesser force will be acting on the outside of the piston 11 than at equilibrium condition. The greater force then applied to the back of the piston by spring 16 and the air pressure in chamber 13 will cause the piston to be displaced to the right from the position shown in FIGURE 3. When this occurs, the flanged end 32 of pin 31 which is connected at its other end to shaft 12 of piston 11, engages the shoulder 33 of spool 20. Further movement of the piston to the right causes the spool to move away from its seat 21, opening the flow path between pipe 40 (which is connected to outlet 5 of the bag) and exhaust 8, thus allowing gas to flow from the bag. The volume of the bag and of the displaced fluid thus decrease, the buoyant force acting on the equipment decreases and the equipment sinks to a greater depth. When the equipment reaches the depth at which the pressure equals the preset equilibrium pressure, the piston will move back to the left, flange 32 will no longer exert a force against shoulder 33 and spring 23 will force spool 20 back into seat 21. Gas flow from the bag then ceases since the flow path between outlet 5 of the bag (through pipe 40) and exhaust port 8 is closed. During the operation just described, spool 25 remains seated in seat 26, it being operated on by no force other than that of spring 28. The pin 34 which extends between spool 20 and spool 25 is free to move within the spool 20 unless and until it is contacted by pin 31 moving to the left.

If the equipment sinks to a greater depth than the equilibrium depth (the condition represented in FIGURE 5), the fluid pressure will be increased and a greater force will be acting on the outside of the piston 11 than at the equilibrium condition. This greater force will overcome the force acting against the rear of the piston by spring 16 and the air pressure in chamber 13 and the piston will be displaced to the left from the position shown in FIGURE 3. When this occurs, pin 31 attached to the end of piston shaft 12, after moving a small distance to the left will contact pin 34. Since pin 34 is securely anchored in spool 25, further movement to the left of the piston and the pins 31 and 34 will cause the spool 25 to move away from its seat 26, opening the flow path through spool 25 and seat 26 between pipe 37 (which is connected to inlet 4 of the bag) and pipe 38 (which is connected to the gas supply tank 7), thus allowing gas to flow from the gas tank to the bag 3. This gas flowing into the bag will cause the volume of the bag and consequently the volume of the fluid displaced by the bag to be increased. This increased volume of displaced fluid then causes an increased buoyant force to act upon the equipment, causing it to rise to a lesser depth. When the equipment reaches the depth at which the fluid pressure equals the preset equilibrium pressure, piston 11 will move back to the right releasing the pressure exerted against the spool 25 through pin 34, and spring 28 will force spool 25 back into seat 26, closing the flow path between inlet 4 of the bladder and the gas supply tank 7. Gas flow to the bag now ceases. During the operation just described, spool 20 remains firmly seated, it being operated on by no other force than that of spring 23.

In order to prevent the intake gas flowing into the bag from mixing with the exhaust gas flowing from the bag, a rolling diaphragm 29 is provided to seal the cavity between the pin 34 and the valve housing at a point between the two spools 20 and 25. Additionally, to prevent the input gas flowing from the gas source 7 to the bag from escaping outside the depth sensitive valve 6, another rolling diaphragm 30 is provided to seal the cavity between the extended shaft 36 of spool 25 and the valve housing at the end of the housing opposite the piston.

Because there is a finite time lapse between a change in pressure and the reaction of the piston in response to such a change, the equipment will not stop at exactly the predetermined depth but will have a slight oscillatory motion when recovering from the change in depth. However, under most conditions, this oscillatory motion is less than plus or minus one percent of the predetermined depth.

The gas used in the flotation system just described must have a higher vapor pressure than the fluid pressure at the maximum depth at which the equipment is to operate. If this vapor pressure were less than or equal to the fluid pressure acting on the bag, no gas would flow from the gas source to the bag since the flow of a gas depends on a pressure differential between the source and the end point, the gas flowing from a point of higher pressure to one of lower pressure.

Further, it is highly desirable that the gas have a very high expansion ratio (volume of gas/volume of liquid). The submergible body will have only a limited amount of storage space for liquified gas. The useful, or functional, life of the depth regulating means is directly related to the amount of liquified gas that can be carried with the submergible body. This life is, however, directly proportional to the expansion rate of the liquified gas, that is, the volume of gas produced on vaporization of a given volume of liquid. Thus, as the expansion rate of the gas in increased, that is, as more gas is produced for a given quantity of liquid, the length of time during which the body can remain at the proper depth is proportionately increased.

One advantageous characteristic of this invention not heretofore discussed, is that the equipment can be made to float to the surface of the fluid when the gas pressure gets below a predetermined limit. This is effected by placing a pressure sensing switch 60 (as, for example, the Model 91M Subminiature Pressure Switch made by Servonic Instruments Inc.) in or at either end of the pipe 38 of FIGURE 2, and a solenoid operated valve 50 (for example, the B2-DA9-175 valve made by Skinner Valve Co.) at the outlet 5 of the bag. When pressure in the tank 7 drops slightly below the vapor pressure of the gas, the pressure sensing switch closes a pair of contacts which connects a source of potential (for example, from within the instrument package 10) to the solenoid valve at the outlet 5, closing the valve and preventing any further gas from leaving the bag. A pressure slightly below the vapor pressure of the gas is chosen to activate the pressure sensitive switch because this pressure indicates the condition of all the liquid gas in the tanks 7 and 7' being vaporized and the gas in the tanks being nearly exhausted. Stated another way, the pressure will remain constant in a tank as long as there is some unvaporized liquid gas in the tank. This constant pressure is the vapor pressure of the gas. As soon as all the liquid gas is vaporized, no further gas is formed in the tank and the subsequent removal of gas will reduce the pressure in the tank. As indicated earlier, if the pressure in the tank drops to the pressure of the fluid acting on the bag, no more gas will flow into the bag.

Closing of the bag outlet by the solenoid valve prevents gas from leaving the bag. Hence, as soon as the equipment is disturbed from its equilibrium position by any of the factors previously discussed, it will rise to the surface. If the disturbance causes the equipment to rise, it will continue to rise, no gas being allowed to escape from the bladder, while if the disturbance causes the equipment to sink, gas will flow to the bag and cause the equipment to reverse its downward course and begin to rise. Since no gas can be released from the bag as it passes through the equilibrium position, the equipment will continue to rise to the surface.

The recovery function above described can also be effected by using a timer 60' in place of the pressure sensing switch 60 to activate the solenoid valve. The timer can be set to close a switch at some time prior to the predetermined time of exhaustion of the gas from the tank.

It should be noted that the shell 1 shown in FIGURE 2 serves only to protect the bag 3 from possible "hostile" elements in the fluid medium, and that in a "non-hostile" environment the shell 1 would not be necessary.

It is to be understood that the form of my invention, herewith shown and described, is to be taken as illustrative of a preferred embodiment thereof, and that various changes in shape, size and arrangement of the parts may be resorted to without departing from the spirit and scope of the invention. Particular note should be given to the fact that although the term fluid has generally been used in its "liquid" connotation, the invention would be equally applicable to a fluid such as air.

What is claimed is:

1. An automatic depth control device for controlling the depth to which a body is immersed in a fluid medium, comprising:
  (a) an inflatable bag attached to said body;
  (b) a protective housing for said inflatable bag, said housing having perforations therein of such size as to allow free passage of the fluid but not of any foreign objects within the fluid;
  (c) a gas container attached to said body;

(d) an exhaust path from said inflatable bag;
(e) an intake path from said gas container to said inflatable bag;
(f) a piston movable in response to fluid pressure thereon;
(g) two collinear valves operative responsive to said fluid pressure on said piston, the first of said two collinear valves being located in said intake path and the second of said two collinear valves being located in said exhaust path;
   whereby at a predetermined fluid pressure, both of said collinear valves are closed,
   whereby at a fluid pressure greater than said predetermined pressure, the first of said two collinear valves opens to admit gas from said gas container along said intake path into said inflatable bag, and
   whereby at a fluid pressure lower than said predetermined fluid pressure, the second of said two collinear valves opens to allow gas to flow from the inflatable bag along said exhaust path.

2. A device sensitive to pressure in a fluid medium, comprising:
   (a) a piston responsive to pressure upon it from said fluid medium;
   (b) a piston shaft, a portion of which is threaded, attached to said piston;
   (c) a threaded collar movable along said threaded portion of said piston shaft;
   (d) a variable compression spring acting against said threaded collar and thereby against said piston;
   (e) a chamber behind said piston;
   (f) diaphragms sealing air pressure within said chamber;
   (g) a first valve comprising a spool and a seat;
   (h) a second valve collinear with said first valve also comprising a spool and a seat;
   (i) two springs, one of each being mounted behind said spools and tending to force said spools against their respective seats;
   (j) a first pin with a flanged end attached to the end of said piston shaft and extending into an open area within said first spool;
   (k) a second pin collinear with said first pin and securely anchored in said spool of said second valve, whereby the force from said variable compression spring along with the air pressure within said chamber forces said piston in a first direction opposite from that of the pressure from said fluid medium, thereby creating an equilibrium condition at a fluid medium pressure determinable by adjustment of said threaded collar,
   whereby at said predetermined fluid pressure, both of said collinear valves are closed and both of said spools are seated against their respective seats,
   whereby at a fluid pressure less than said predetermined pressure, said piston moves in said first direction to cause said flanged end of said first pin to engage the shoulder of said first spool, move the spool away from its seat and thereby open said first valve, and
   whereby at a fluid pressure greater than said predetermined pressure said piston moves opposite to said first direction, to cause said first pin to contact said second pin and force said second spool away from said second seat, thereby opening said second valve.

References Cited
UNITED STATES PATENTS

| | | | |
|---|---|---|---|
| 952,452 | 3/1910 | Leon | 102—14 |
| 1,120,621 | 12/1914 | Lindmark | 102—14 |
| 3,179,962 | 4/1965 | Shear et al. | 9—8 |
| 3,257,672 | 6/1966 | Meyer et al. | 9—8 |

TRYGVE M. BLIX, *Primary Examiner.*

U.S. Cl. X.R.

114—16